UNITED STATES PATENT OFFICE.

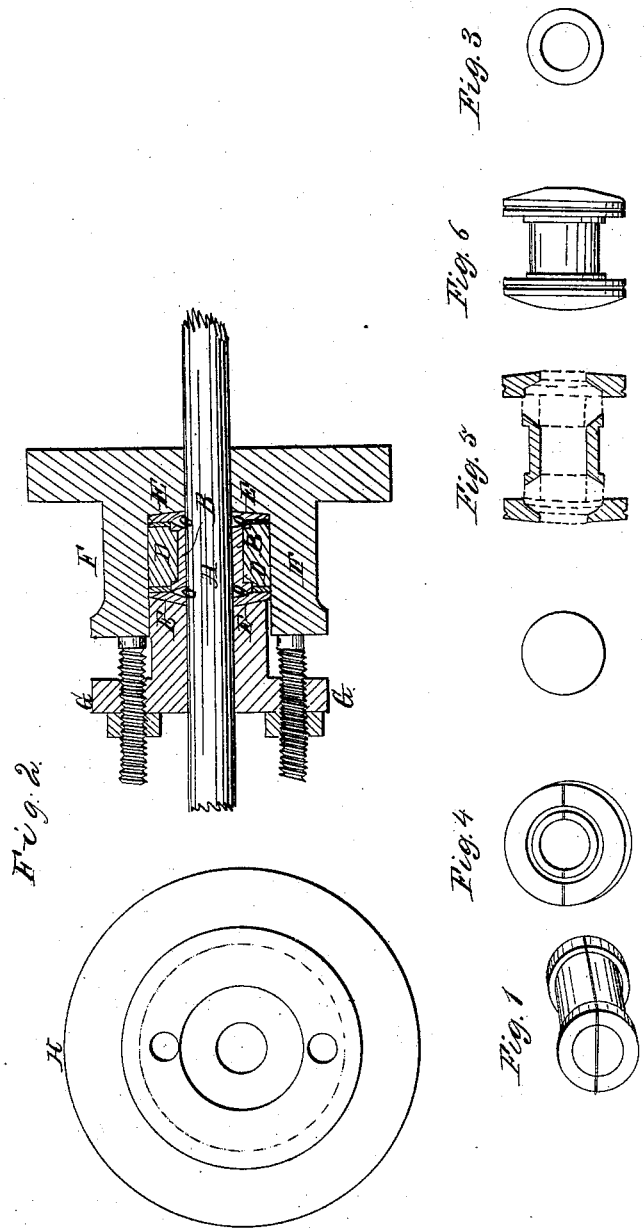

JOHN H. GOULD, OF PHILADELPHIA, PENNSYLVANIA, ASSIGNOR TO HENRY E. WALLACE.

PACKING FOR STEAM-ENGINES.

Specification of Letters Patent No. 31,512, dated February 19, 1861.

*To all whom it may concern:*

Be it known that I, JOHN HENRY GOULD, of the city of Philadelphia and State of Pennsylvania, have invented a new and Improved Method of Packing Steam-Engines; and I do hereby declare that the following is a full and exact description thereof, reference being had to the annexed drawings, which make a part of this specification.

Figure 1 is a perspective view of the invention. Fig. 2 is a horizontal sectional view of the same as applied. Fig. 3 is an end view of the metallic cylinder—before cutting—showing its concavity. Fig. 4 is and end view of the flange of the metallic packing—showing the concavity corresponding to that of the cylinder. Fig. 5 is a horizontal sectional view of the metallic cylinder and flanges. Fig. 6 is a view of the packing when fitted together.

The nature of my invention consists in the peculiar application of a metallic substance to the piston rod and stuffing box of a steam engine or pump instead of hemp cotton gum or other vegetable substance. This metallic substance is an alloy which possesses a lubricating property that dispenses with the oil grease or fatty matter for lubrication of the piston rod. This alloy is composed of one hundred pounds of lead, twenty pounds of antimony, fifteen pounds of block tin and two and a half pounds of bismuth, fused together and thoroughly incorporated. Besides effectually preventing the escape of steam this substance at the same time that it lubricates fills up any irregularities in the surface of the rod, is entirely free from any grit that might channel or furrow it and is measurably void of all that friction which ordinarily produces the wear and tear of engines. The comparative advantage of this packing lies in its durability combined with the saving of time and labor lost in the almost daily packing of the engines by the method now in vogue—it being guaranteed when once applied to last for a period of from two to five years without renewal. That this nature and advantage of my invention may be easily understood to describe its construction and operation I now proceed.

In Fig. 1, I construct two hollow half cylinders composed of the metallic alloy which when put together around the rod have concave spaces and raised flanges at each end to form the boxes or ground surfaces for the joint, movable on the piston rod.

In Fig. 2, A is the piston rod of the engine B is the hollow half cylinders as shown above described in No. 1. placed here in position on the piston rod. C concavity formed at each end of the cylinder for a chamber to receive a packing of felt and shavings of the metallic substance to help make the joint steam tight as well as to clean and help furbish the rod. D two rings of india rubber which expanded by the heat of the steam compress the two half cylinders around the rod and by gradually pressing upon it the concave surfaces of the metallic packing exercise the power which make the steam tight joint. E flanges raised on the ends of the metallic packing for the purpose of giving wider space to the concavities which form the felt and shaving chamber so as to increase their containing capacities. F stuffing box of engine (in sections). G cap or lid of the stuffing box (in sections). H bird's eye view of the cap of the stuffing box.

In Fig. 3 is displayed the concave end of the cylinder before it is sawed in two as represented in Fig. 1.

In Fig. 4 there is a representation of the raised flanges with the concave recess and cylindric opening to receive the end of the metallic cylinder and the piston rod.

In Fig. 5 we have sections of the flange and cylinder which show the two concave chambers as formed in C of Fig. 2 and which make two felt joints.

In Fig. 6 the flanges and the cylinder are fitted together and ready to be placed in the stuffing box.

In the operation or practical application of this invention to a steam engine or pump the two parts of the metallic cylinder are placed upon the rod and the concavities in the ends of the metallic substance with their flanges which are likewise sawed in two for compressibility are put to their corresponding concavities and flanges similarly divided to form the felt and metallic shaving chambers and together with the cylinder to which they are attached secured there by two turns of wire. Felt rings or gaskins cut so as to clasp the rod and just fill the concave chambers are then placed with metallic shavings or turnings in the two ends of the cylinder around the piston rod so as to clasp and move over that with the (piston rod moving within) steam tight joint formed by the concave flanges and their felt and shaving packing in continuity with the concave surfaces of the half cylinders above and below. There is then put around the cylinder a thin fillet of india rubber which is bound in its place by a thread. Around about this a ring of india rubber is bound of sufficient thickness to fill up the space remaining between the metallic cylinder and the inside of the stuffing box. This elastic substance when expanded by the heat of the steam compresses the surface of the metallic packing on the piston rod and so effects the essential feature of my invention. But this compressive power of the rubber may also be produced by an elastic steel spring, or by another elastic substance it might be thought better to substitute for it; and in some cases the purposes of my invention would be better served by them than by the rubber.

The rubber ring and fillet being secured in their places between the flanges and surrounding the metallic cylinder the rod is moved back and the whole is inserted in the stuffing box. Then the cap or lid is put on and secured by the screw bolts and nuts; when the engine is ready for use. The cap is not wrenched up tight as in other engines with the ordinary packing but is merely screwed up by the force of the thumb and finger as I do not depend upon that for the tightness of my joint, but upon the elastic force of the rubber or spring which is increased in the ratio of the steam's expansive power so acting on the metallic cylindric packing as to form an ever continuous ground joint between the polished iron piston rod and the softer lubricating surfaces of the metallic alloy. Thus in fine the elastic power used to press the yielding metallic packing against the piston rod while it is sufficient to stop the escape of steam is not strong enough to produce wearing and tearing friction; but is just strong enough to rub off the softer metallic alloy upon the iron rod, polish, lubricate and fill up any irregularities or furrows in its surface so as to form between the corresponding convex and concave surfaces a fine smooth joint through which the steam cannot pass.

I do not claim merely the application of a softer metal than iron, for the purpose of making a tight steam joint, around an iron piston rod although I am not aware that such has ever been before used, but

I claim—

The application of india rubber, steel springs or other elastic substances in combination with the alloy, the composition of which is given above in the manner and form hereinbefore set forth to produce a tight steam joint.

JOHN HENRY GOULD.

Witnesses:
JOHN LANING,
MALCOLM McA. FIELD.